(12) United States Patent
Digard Brou De Cuissart et al.

(10) Patent No.: US 9,981,308 B2
(45) Date of Patent: May 29, 2018

(54) METHOD FOR MANUFACTURING A CORE FOR MOULDING A BLADE

(71) Applicant: SAFRAN AIRCRAFT ENGINES, Paris (FR)

(72) Inventors: Sebastien Digard Brou De Cuissart, Co Louth (IE); Charlotte Marie Dujol, Le Mee sur Seine (FR); Patrice Eneau, Moissy-Cramayel (FR); Philippe Metron, Nogent sur Oise (FR); Matthieu Jean-Luc Vollebregt, Asnieres sur Seine (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days. days.

(21) Appl. No.: 15/323,300

(22) PCT Filed: Jun. 29, 2015

(86) PCT No.: PCT/FR2015/051775
§ 371 (c)(1),
(2) Date: Dec. 30, 2016

(87) PCT Pub. No.: WO2016/001564
PCT Pub. Date: Jan. 7, 2016

(65) Prior Publication Data
US 2017/0151604 A1    Jun. 1, 2017

(30) Foreign Application Priority Data

Jun. 30, 2014    (FR) .................... 14 56168

(51) Int. Cl.
*B22C 9/10*    (2006.01)
*B22C 1/00*    (2006.01)
(Continued)

(52) U.S. Cl.
CPC ............... *B22C 9/10* (2013.01); *B22C 1/00* (2013.01); *B22C 9/12* (2013.01); *B22C 9/24* (2013.01);
(Continued)

(58) Field of Classification Search
CPC .. B22C 1/00; B22C 9/10; B22C 9/103; B22C 9/12; B22C 9/24
(Continued)

(56) References Cited

U.S. PATENT DOCUMENTS 6,286,582 B1    9/2001    Chartier et al.
6,720,028 B1 *  4/2004    Haaland .......... B22C 9/10
                                        427/133
(Continued)

FOREIGN PATENT DOCUMENTS

EP    1 652 603 A2    5/2006
EP    1 671 720 A1    6/2006
(Continued)

OTHER PUBLICATIONS

International Search Report dated Oct. 20, 2015 in PCT/FR2015/051775 filed Jun. 29, 2015.
(Continued)

*Primary Examiner* — Kevin E Yoon
(74) *Attorney, Agent, or Firm* — Oblon, McClelland, Maier & Neustadt, L.L.P.

(57) ABSTRACT

A method of manufacturing a core for molding a blade of a turbomachine, including placing a flexible ceramic sheet in a cavity of a mold in such a way as to shape the ceramic sheet, introducing a ceramic paste into the cavity of the mold, the ceramic paste forming at least one frame in contact with the ceramic sheet, and co-sintering the ceramic sheet and the frame in such a way as to rigidly join together the ceramic sheet and the frame, the frame maintaining the
(Continued)

shape of the ceramic sheet given by the mold during the preceding co-sintering phases.

9 Claims, 6 Drawing Sheets

(51) Int. Cl.
  *B22C 9/24* (2006.01)
  *B22C 9/12* (2006.01)
  *B22D 25/02* (2006.01)
  *B28B 3/02* (2006.01)
  *B28B 1/24* (2006.01)
  *B28B 11/04* (2006.01)
  *F01D 5/18* (2006.01)
  *C04B 41/00* (2006.01)
  *C04B 41/50* (2006.01)
  *C04B 41/87* (2006.01)

(52) U.S. Cl.
  CPC ............ *B22D 25/02* (2013.01); *B28B 1/24* (2013.01); *B28B 3/025* (2013.01); *B28B 11/04* (2013.01); *C04B 41/009* (2013.01); *C04B 41/0072* (2013.01); *C04B 41/5024* (2013.01); *C04B 41/5035* (2013.01); *C04B 41/87* (2013.01); *F01D 5/18* (2013.01); *F05D 2230/21* (2013.01); *F05D 2240/304* (2013.01); *F05D 2260/20* (2013.01)

(58) Field of Classification Search
  USPC .............................. 164/9–11, 369
  See application file for complete search history.

(56) References Cited

U.S. PATENT DOCUMENTS

| 7,014,424 | B2* | 3/2006 | Cunha .................... B22C 9/103 |
| | | | 415/115 |
| 2006/0090871 | A1 | 5/2006 | Snyder et al. |
| 2006/0130994 | A1 | 6/2006 | Grunstra et al. |
| 2006/0201651 | A1 | 9/2006 | Grunstra et al. |
| 2007/0114001 | A1 | 5/2007 | Snyder et al. |
| 2007/0163745 | A1 | 7/2007 | Grunstra et al. |
| 2007/0261811 | A1 | 11/2007 | Guerche et al. |
| 2008/0169412 | A1 | 7/2008 | Snyder et al. |
| 2011/0135446 | A1 | 6/2011 | Dube et al. |
| 2012/0163992 | A1 | 6/2012 | Propheter-Hinckley et al. |
| 2015/0122445 | A1 | 5/2015 | Truelle et al. |

FOREIGN PATENT DOCUMENTS

| EP | 1 854 569 | A1 | 11/2007 |
| EP | 2 335 845 | A1 | 6/2011 |
| EP | 2 468 433 | A2 | 6/2012 |
| FR | 2 785 836 | A1 | 5/2000 |
| WO | WO 2013/167847 | A2 | 11/2013 |

OTHER PUBLICATIONS

Search Report and Written Opinion dated May 4, 2015 in French Patent Application No. 1456168 (with English translation of categories of cited documents).

Written Opinion dated Oct. 20, 2015 in PCT/FR2015/051775.

* cited by examiner

METHOD FOR MANUFACTURING A CORE FOR MOULDING A BLADE

FIELD OF THE INVENTION

The present invention relates to a method for manufacturing a core intended to serve for casting a blade of a turbine engine.

PRIOR ART

In order to improve the aerodynamic performance of blades of turbine engines, it is necessary to reduce the thickness of the trailing edge of the blades. The thickness of the trailing edge of the blades depends, on the one hand, on the thickness of the trailing edge slot through which the cooling air circuit of the blade leads, and on the other hand the thickness of the two metal walls of the blade, positioned on either side of the trailing edge slot.

A reduction in thickness of the trailing edge of the blades can be obtained by a reduction in the thickness of the trailing edge slot. However, this reduction in thickness of the trailing edge slot necessitates the reduction of the thickness of the ceramic core traditionally used during casting of the blade. Such a thickness reduction, however, poses problems of fragility of the core serving for manufacture of the blades. In fact, the cores serving for casting the blades of turbojet engines are very fragile during their manufacture.

The cores intended for casting blades are generally manufactured using the following steps:
  preparing a solution of ceramic paste;
  injecting, into a mold of suitable shape, the ceramic paste previously prepared;
  baking by sintering the core obtained in the previous step;
  impregnating in a resin the core obtained in the previous step.

The core obtained is used for casting a blade. The presence of the core makes it possible to provide a cavity in the thickness of the blade, thus allowing air circulation inside the blade.

However, the cores manufactured according to this conventional method encounter problems when the thickness of the core is reduced at the trailing edge. In the first place, cracks can appear during baking of the cores due to problems occurring during injection. In fact, the ceramic paste having difficulty tolerating very fine thicknesses due to its viscosity, the paste then has a tendency to fill more rapidly the thick areas while circumventing the thin area, then filling the thin area last. This thus creates a re-attachment between two paste fronts in the thin area. This re-attachment favors the appearance of cracks after baking. Secondly, fissures can be created during handling of the cores between their removal from the mold and baking, because the cores are then in a transitional state between a viscous state required for injection and a solid state following baking, making them particularly fragile, particularly at the thin area.

In order to solve these problems, a method for manufacturing a ceramic core for casting a blade of a turbine engine from a thin and flexible sheet of ceramics is known from document FR2785836. In this document, a method comprising the following steps is described:
  preparing a solution of ceramic paste;
  casting the ceramic paste prepared in the preceding step in the shape of a band so as to obtain a flexible ceramic sheet;
  drying the sheet obtained in the preceding step;
  shaping the sheet in a mold;
  preheating the sheet in the mold;
  pressing the sheet in the mold;
  baking the sheet obtained in the preceding step;
  impregnating the sheet obtained in the preceding step by a resin;
  assembling, if necessary, several sheets obtained according to the method described previously, or a sheet obtained previously with a thick core obtained according to a standard injection molding method;
  using the core obtained in the preceding step to cast a blade.

The method described in this document is expensive to make because it comprises additional steps compared with traditional manufacture of a thick core, particularly in order to maintain the shape of the ceramic sheet for baking. In fact, the flexibility of the ceramic sheet being such that simply running it through a mold is not sufficient to shape the ceramic sheet, the ceramic sheet resumes it initial shape upon leaving the mold.

SUMMARY OF THE INVENTION

It is an aim of the present invention to propose a simpler method for manufacturing a thin core allowing blades to be produced having a thin trailing edge slot, while limiting the problems of crack formation during manufacture of the cores.

This aim is achieved according to a first aspect of the invention thanks to a method for manufacturing a core for casting a blade of a turbine engine, comprising the steps of:
  placing a flexible ceramic sheet in a cavity of a mold so as to shape the ceramic sheet,
  introducing a ceramic paste into the cavity of the mold, the ceramic paste forming at least one frame in contact with the ceramic sheet, and
  co-sintering the ceramic sheet and the frame so as to secure the ceramic sheet and the frame together, the frame maintaining the shape of the ceramic sheet given by the mold during the steps preceding co-sintering.

What is designated by "co-sintering" is a step of baking together the ceramic sheet and the ceramic paste forming the frame at a temperature such that the binder comprised in the sheet and the paste evaporates, which has the effect of welding them together.

The proposed method allows a reduction in the thickness of the core without increasing the risk of fissure formation by providing sufficient flexibility to the core to solve the problems of fissure formation due to handling, this without increasing the number of steps in the method.

According to another feature, the method comprises a preliminary step of cutting recess patterns in the ceramic sheet.

According to an additional feature, the recess patterns have a rectangular, triangular and/or sinusoidal shape.

According to a supplementary feature, the space between the recess patterns is less than 5 millimeters.

According to another feature, the ceramic sheet comprises silica and alumina.

According to an additional feature, the ceramic paste in which is formed the frame comprises silica and zircon.

According to an additional feature, the ceramic sheet has a Young's modulus of less than 5 GigaPascals.

According to another feature, the ceramic sheet has a thickness comprised between 0.04 millimeters and 0.5 millimeters.

According to another aspect, the invention relates to a method for manufacturing a core for casting a blade of a turbine engine, comprising steps of:
- cutting at least one recess pattern into a flexible ceramic sheet;
- positioning the cut ceramic sheet into a mold;
- heating the mold;
- compressing the ceramic sheet inside the mold so as to shape the ceramic sheet;
- sintering the ceramic sheet so as to make the shaped ceramic sheet rigid.

According to another aspect, the invention relates to a method for manufacturing a turbine engine blade comprising at least one step of:
- casting the blade in a mold containing a core obtained by a method as previously described.

According to another aspect, the invention relates to a turbine engine comprising a blade manufactured according to a manufacturing method as defined previously.

PRESENTATION OF THE DRAWINGS

Other features, aims and advantages of the present invention will appear upon reading the detailed description which follows, and with reference to the appended drawings, given by way of non-limiting examples wherein.

DETAILED DESCRIPTION OF AN EMBODIMENT

As shown in FIGS. 1, 2a, 2b, 3a and 3b, the method for manufacturing a core for manufacturing a blade of a turbine engine according to the first embodiment of the invention comprises steps of:
(a) manufacturing a thin and flexible ceramic sheet 1 by casting a thin band onto a support of a thin band of ceramic paste, and drying of the ceramic sheet 1 thus obtained;
(b) positioning the ceramic sheet 1 in a ceramic paste injection mold 2;
(c) injecting the ceramic paste into the desired locations in the mold 2 so as to locally surround the ceramic sheet 1 by forming frames 3 of ceramic paste in contact with said ceramic sheet 1 so as to coat portions of said ceramic sheet 1. The injection of ceramic paste is accomplished so that the ceramic sheet 1 and the frames 3 made of ceramic paste constitute a core, the shape whereof is the final shape desired for the manufacture of the blade;
(d) baking the core thus obtained according to a standard ceramic sintering method by co-sintering the ceramic sheet 1 with the frames 3 made of ceramic paste, so that the ceramic sheet 1 and the frames 3 become secured to one another and form a rigid core (the Young's modulus then being on the order of 400 GPa);
(e) impregnating the core obtained with a resin or an organic polymer.

The method according to a first embodiment makes it possible to reduce the minimum thickness of the core to the thickness of the ceramic sheet 1 that is used, and to locally increase the thickness of the core by injections of frames 3 made of ceramic paste. In this manner, it is possible to reduce the minimum thickness of the core to a thickness on the order of 0.04 mm, a thickness that is currently achievable with ceramic sheets. Preferably, the thickness of the ceramic sheet is comprised between 0.04 mm and 0.5 mm.

The method according to the first embodiment also allows, thanks to the injection of frames 3 made of ceramic paste around the ceramic sheet 1, to solve the problems of fissure formation due to handling prior to baking. In fact, the ceramic sheet 1 is sufficiently flexible to withstand this handling, in contrast to a very thin area made according to a standard injection method. Advantageously, the ceramic sheet 1 has a Young's modulus of less than 5 GPa, so as to have flexibility allowing it to resist constraints encountered during handling prior to baking.

The method according to the first embodiment also allows to solve the problems of cracks appearing during baking as a result of problems occurring during the injection step, by substituting, for the injection of ceramic paste into a thin area, shaping of the ceramic sheet 1 in the mold 2. The ceramic sheet 1, thanks to its flexibility, adapts to the shape of the mold 2. Advantageously, the ceramic sheet has a Young's modulus of less than 5 GPa, thus allowing the ceramic sheet 1 to have sufficient flexibility to adapt to complex shapes so as to be able to create a complex cavity structure inside the blade.

The method according to the first embodiment also allows limiting the number of manufacturing steps, and thus limiting the cost of manufacture. In fact, by injecting frames 3 made of ceramic paste around the ceramic sheet 1 while the ceramic sheet 1 is shaped in the mold 2, the ceramic sheet does not resume its initial shape and retains the shape imposed by the mold 2. Moreover, such a method also allows eliminating the assembly step after baking several cores, by forming, upon exit from the mold 2, a core the shape whereof corresponds to the desired final shape, and by baking the core thus obtained by co-sintering the ceramic sheet 1 and the ceramic frames 3.

Figure 1:
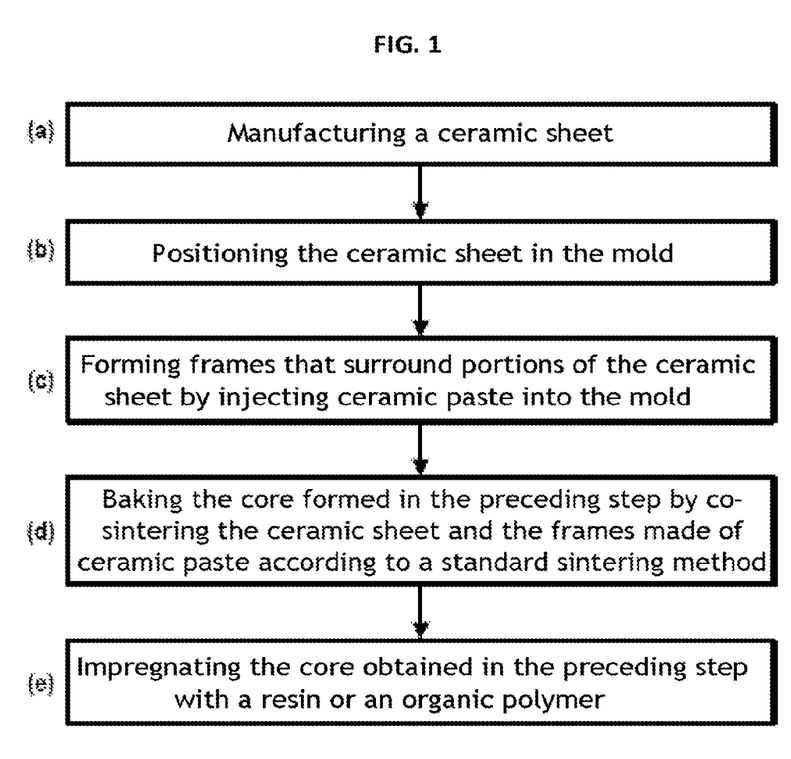
FIG. 1 is a flowchart illustrating steps of a method for manufacturing a core according to a first embodiment of the invention.
Figure 2A:
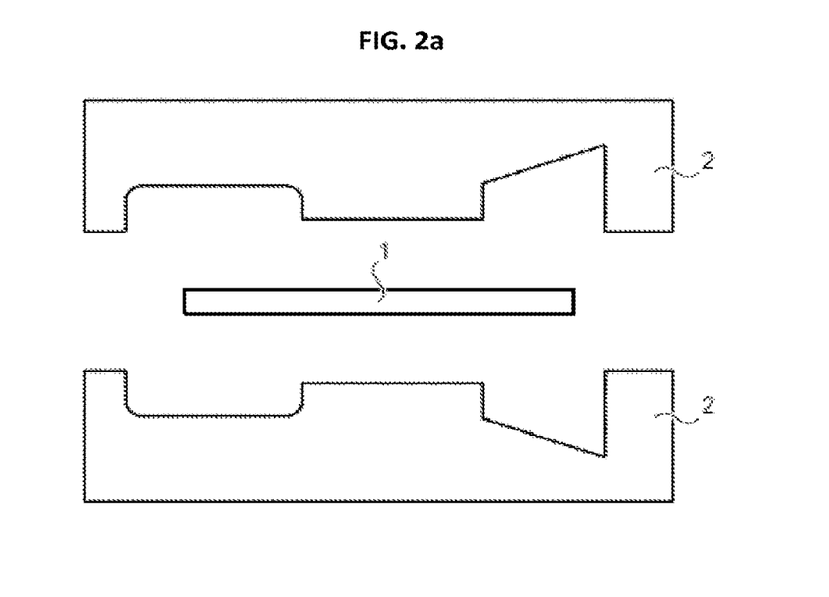
FIGS. 2a and 2b each show a schematic for casting ceramic paste around a ceramic sheet.
Figure 2B:
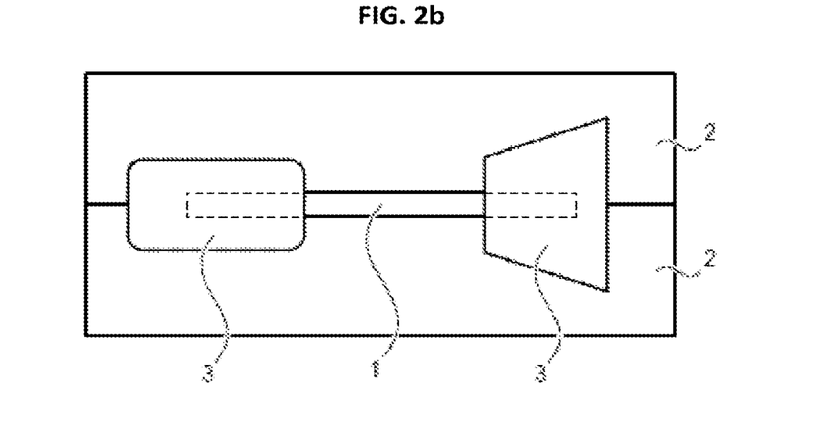
Figure 3A:
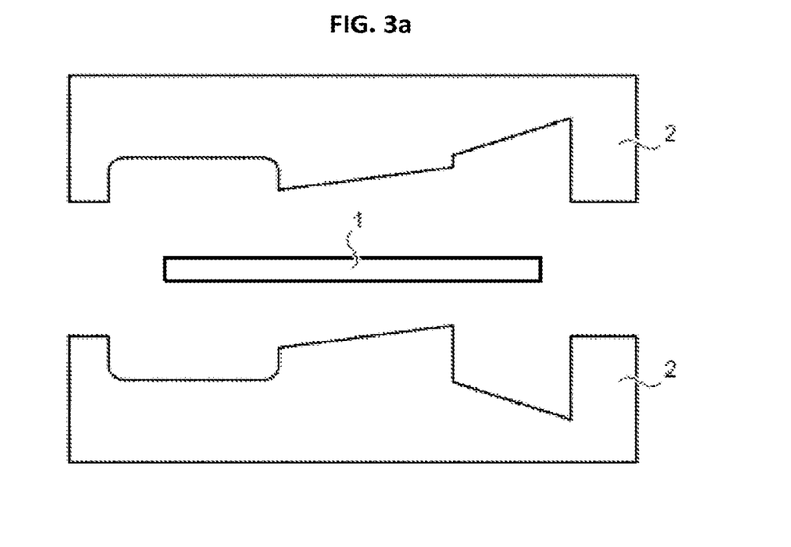
FIGS. 3a and 3b each show a schematic for casting ceramic paste around a ceramic sheet in which the deformation of the ceramic sheet is shown schematically.
Figure 3B:
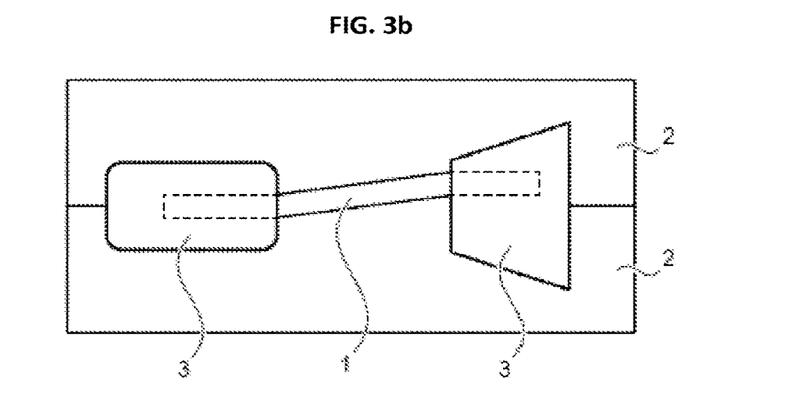
Figure 4A:
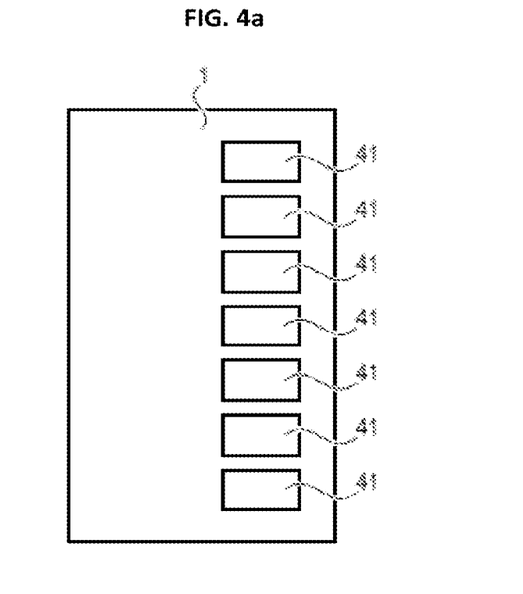
FIGS. 4a, 4b and 4c each show a ceramic sheet in which patterns have been cut in conformity with a second embodiment of the invention.
Figure 4B:
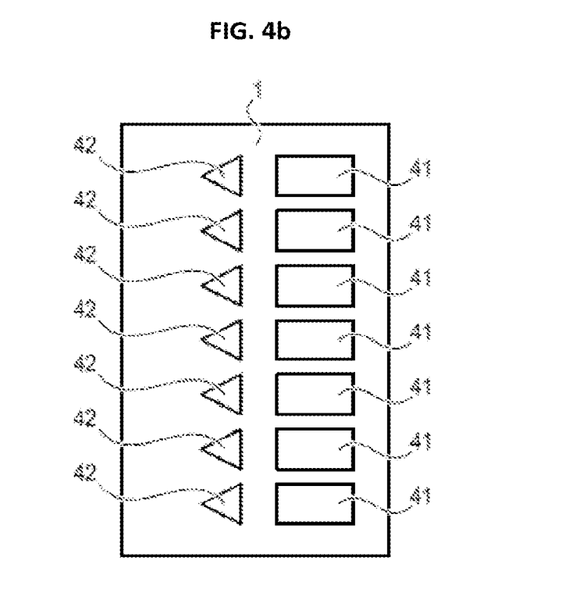
Figure 4C:
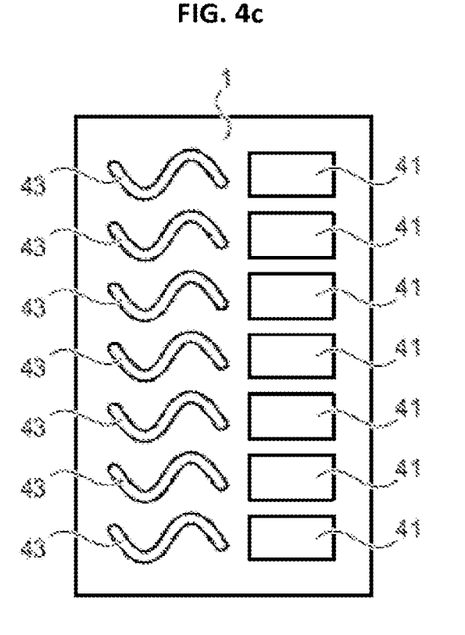

According to a second embodiment of the invention shown in FIGS. 4a, 4b and 4c, the manufacturing method comprises a step (b') of cutting out recess patterns 41, 42, 43 in the ceramic sheet 1, performed prior to the step (b) of shaping in the mold 2. These recess patterns 41, 42, 43 make it possible to create a core with a network of recesses. After casting, these recesses correspond to metal areas of the blade, and the ceramic core to internal cavities of the blade.

The creation of the recess patterns 41, 42, 43 makes it possible to create a circuit of cavities in the blade, the ceramic core being the exact negative of this circuit of cavities.

Current cutting techniques make it possible to created recess patterns 41, 42, 43, the size whereof can be less than 5 mm, and the spacing between each recess pattern 41, 42, 43 can be less than 5 mm. It is then possible to create layers of metal (corresponding to the recess patterns 41, 42, 43) with a size less than 5 mm positioned on either side of trailing edge slots the width whereof is less than 5 mm (corresponding to the spaces between the recess patterns 41, 42, 43).

The shape of the recess patterns 41, 42, 43 can vary. A first recess pattern 41, as shown in FIGS. 4*a*, 4*b*, 4*c* can be of rectangular shape. A second recess pattern 42, as shown in FIG. 4*b*, can have a triangular shape. A third recess pattern 43, as shown in FIG. 4*c*, can be of sinusoidal shape.

According to a third embodiment, the manufacturing method is accomplished, in accordance with the first or the second embodiment by using a ceramic sheet 1 which comprises a mixture of silica and alumina, and frames 3 made of a ceramic paste comprising a mixture of silica and zircon. In fact, this embodiment makes it possible to obtain a compromise between rigidity and tendency to disintegrate. In fact, a ceramic based on alumina is particularly rigid, but difficult to attack chemically. This has the consequence that this type of ceramic is hard to use for manufacturing cores used for manufacturing blades. A zircon-based ceramic is less rigid, but is easier to dissolve chemically than an alumina-based ceramic. Thus, this type of ceramic is currently used for manufacturing cores used to manufacture blades. A core manufactured according to the third embodiment thus incorporates good rigidity thanks to the alumina-based ceramic sheet which, once baked, forms a rigid kernel and is both easy to eliminate chemically, because when dissolving the zircon-based ceramic, the alumina-based ceramic sheet is no longer supported and is more easily eliminated from the inside of the blade.

Figure 5:
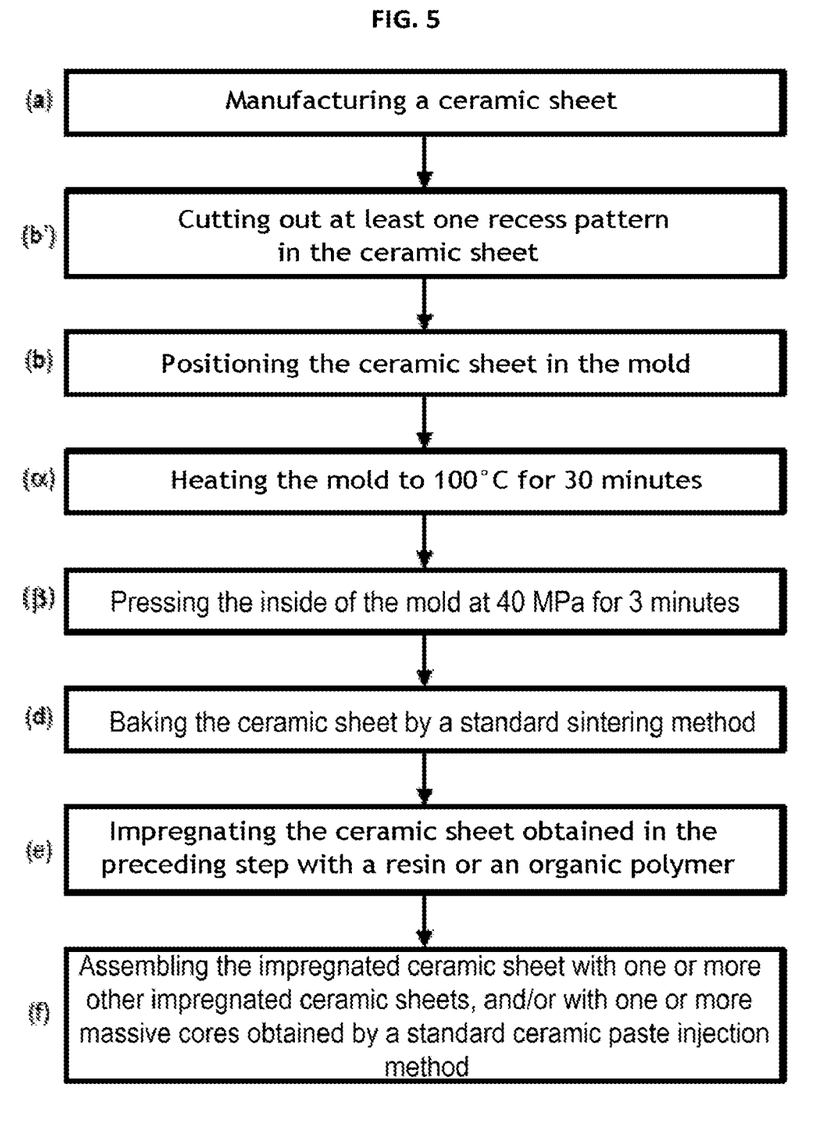
FIG. 5 is a flowchart illustrating steps of a method for manufacturing a core according to another aspect of the invention.

According to another aspect shown in FIG. 5, the method for manufacturing a ceramic core for a blade of a turbine engine includes the following steps:
  (a) manufacturing a thin and flexible ceramic sheet 1 by casting a thin band on a support made of a thin band of ceramic paste (between 0.04 mm and 0.5 mm in thickness), and drying the ceramic sheet 1 thus obtained;
  (b') cutting out at least one recess pattern 41, 42, 43 in the ceramic sheet 1;
  (b) positioning the ceramic sheet 1 obtained in the previous step in a mold 2;
  (α) heating the mold 2 to 100° C. for 30 minutes;
  (β) pressing the inside of the mold under a pressure of 40 MPa for 3 minutes so that the ceramic sheet 1 retains the shape imposed by the mold 2;
  (d) baking by a standard sintering method the ceramic sheet 1 shaped during the previous step, so that the ceramic sheet 1 becomes rigid;
  (e) impregnating the ceramic sheet 1 with a resin or an organic polymer;
  (f) assembling the impregnated ceramic sheet with one or more other impregnated ceramic sheets, and/or with one or more massive cores obtained by a standard ceramic paste injection method.

This method makes it possible to obtain a core, the minimum thickness whereof (for example the thickness of the trailing edge) is particularly thin (from 0.04 mm to 0.5 mm), and the recess patterns 41, 42, 43 whereof make it possible, eventually, to create a complex circuit of cavities inside the blade which will be cast from this core. The complex circuit of cavities inside the blade serving, once the blade is cast and in operation, to circulate air allowing the blade to be cooled and to avoid melting it. Other embodiments are possible such as for example the use of several ceramic sheets 1 to create a single core, the use of other ceramic compositions or the cutting out of recess patterns with different shapes.

The invention claimed is:

1. A method for manufacturing a core for casting a blade of a turbine engine, comprising steps of:
   placing a flexible ceramic sheet in a cavity of a mold so as to shape the ceramic sheet,
   introducing a ceramic paste into the cavity of the mold, the ceramic paste forming at least one frame in contact with the ceramic sheet, and
   co-sintering the ceramic sheet and the frame so as to secure the ceramic sheet and the frame together, the frame maintaining the shape of the ceramic sheet given by the mold during the steps preceding co-sintering.

2. The method according to claim 1, comprising a preliminary step of:
   cutting out recess patterns in the ceramic sheet.

3. The method according to claim 2, wherein the recess patterns have a rectangular, triangular and/or sinusoidal shape.

4. The method according to claim 2, wherein the space between two successive recess patterns is less than 5 millimeters.

5. The method according to claim 1, wherein the ceramic sheet comprises silica and alumina.

6. The method according to claim 1, wherein the ceramic paste forming the frame comprises silica and zircon.

7. The method according to claim 1, wherein the ceramic sheet has a Young's modulus of less than 5 GigaPascals.

8. The method according to claim 1, wherein the ceramic sheet has a thickness comprised between 0.04 millimeters and 0.5 millimeters.

9. A method for manufacturing a turbine engine blade comprising:
   obtaining the core using the method of claim 1; and
   casting the blade in a mold containing the core.

* * * * *